No. 608,433. Patented Aug. 2, 1898.
J. THUNBORG.
RUNNER FOR VEHICLES.
(Application filed July 15, 1897.)
(No Model.)
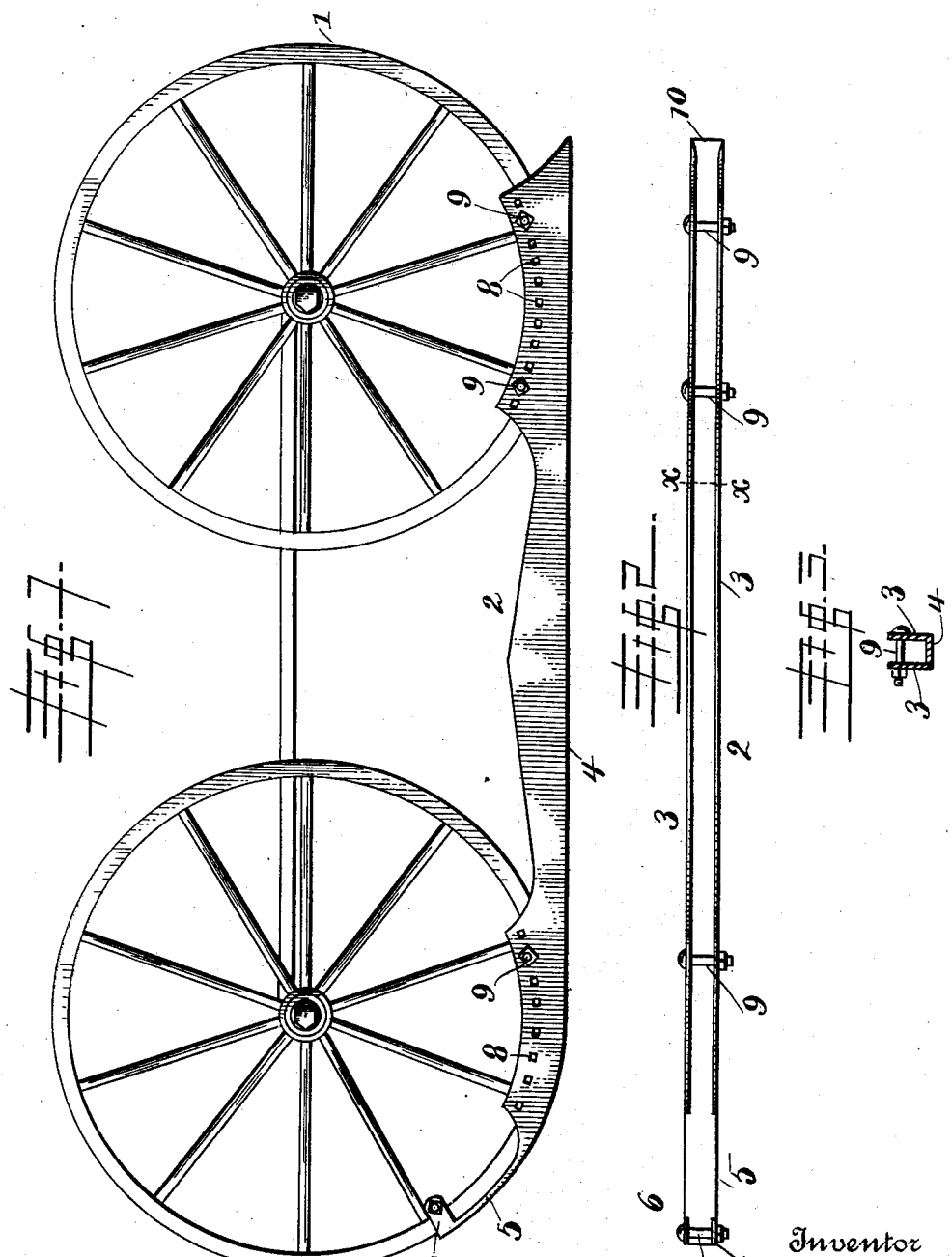
Witnesses
W. E. Bowen
J. Allrillso(?)
Inventor
Jacob Thunborg
by H. B. Wilson
Attorney

UNITED STATES PATENT OFFICE.

JACOB THUNBORG, OF CŒUR D'ALENE, IDAHO.

RUNNER FOR VEHICLES.

SPECIFICATION forming part of Letters Patent No. 608,433, dated August 2, 1898.

Application filed July 15, 1897. Serial No. 644,708. (No model.)

*To all whom it may concern:*

Be it known that I, JACOB THUNBORG, a citizen of the United States, residing at Cœur d'Alene, in the county of Kootenai and State of Idaho, have invented certain new and useful Improvements in Runners for Vehicles; and I do declare the following to be a full, clear, and exact description of the invention, such as will enable others skilled in the art to which it appertains to make and use the same.

My invention relates to runners designed to be attached to wheeled vehicles to convert them into sleighs; and the object of the invention is to provide runners which shall be simple, durable, and inexpensive.

With this object in view the invention consists of certain features of construction and combination of parts, which will be hereinafter fully set forth and claimed.

In the accompanying drawings, Figure 1 is a side view of the running-gear of a vehicle, showing my invention in use. Fig. 2 is a top plan view of one of the runners, and Fig. 3 is a cross-sectional view on the line $x\,x$ of Fig. 2.

1 denotes two vehicle-wheels, and 2 my improved runner, which is secured thereto. Each runner consists of a longitudinal casting provided with side flanges 3 and a smooth running-surface 4. The front end of the casting is curved upwardly, as shown at 5, to engage the front wheel of a vehicle, and is provided with two parallel ears 6, through which passes a bolt 7 for securing that end of the runner to the forward vehicle-wheel. The side flanges are provided with a segmental row of bolt-holes 8, through which pass bolts 9 for the purpose of securing the wheels to the runner. The runner is provided with a flaring rear end 10, so that the vehicle may be more readily drawn in the runner.

In securing the runner in position, as shown in Fig. 1, it will be noticed that the bolts pass through the apertures in the side pieces of the runner adjacent to the spokes of the wheel, so that said wheels will be locked against movement. By arranging a row of these holes as shown it is evident that wheels the spokes of which are arranged at different distances apart may be easily clamped to the runner.

Having thus described my invention, what I claim, and desire to secure by Letters Patent, is—

A runner having a smooth under side and side flanges extending continuously and uninterruptedly from the rear end of the runner to approximately its forward end to form guides to receive and embrace both wheels at the side of a vehicle, said flanges at their rear ends having their inner sides beveled outwardly to form flaring wheel entrance for the purpose of affording the wheels easy admission to the runners, and bolts for locking the wheels to the runners, substantially as set forth.

In testimony whereof I hereunto affix my signature in presence of two witnesses.

JACOB THUNBORG.

Witnesses:
HENRY T. RAY,
JOHN W. PETERS.